United States Patent [19]
Forquer et al.
[11] 3,931,384
[45] Jan. 6, 1976

[54] METHOD OF MAKING END FRAMES FOR UPHOLSTERED FURNITURE

[75] Inventors: Larry J. Forquer; Robert P. Habgood, Jr., both of Bradford, Pa.; John M. Rembold, Limestone, N.Y.
[73] Assignee: Plexowood, Inc., Bradford, Pa.

[22] Filed: Oct. 2, 1972
[21] Appl. No.: 293,845

[52] U.S. Cl. ................ 264/120; 264/119; 264/122; 264/294
[51] Int. Cl.$^2$ ................ B29J 5/00
[58] Field of Search ........... 264/120, 294, 295, 122, 264/119, 250; 249/102

[56] References Cited

UNITED STATES PATENTS 3,354,248 11/1967 Haas et al. .......... 264/120
3,373,233 3/1968 Rondum .......... 264/119
3,439,081 5/1969 Enderlein .......... 264/120

*Primary Examiner*—Robert F. White
*Assistant Examiner*—J. R. Hall
*Attorney, Agent, or Firm*—Buell, Blenko & Ziesenheim

[57] ABSTRACT

A method is provided by which end frames for upholstered furniture are pressure molded in one piece from a mixture of wood flakes and thermosetting resin. They have no grain, are equally strong in all directions, are denser than the wood from which the flakes are derived and permit tacking or stapling the upholstery in place. Simplified processes of forming right and left end frame assemblies are disclosed.

1 Claim, 11 Drawing Figures

METHOD OF MAKING END FRAMES FOR UPHOLSTERED FURNITURE

This invention relates to the manufacture of wood frames for upholstered furniture. It is more particularly concerned with the manufacture of end frames from wood flakes bonded with a resin, and frames so produced.

The term "upholstered furniture" as generally used, and as used hereinafter, comprises upholstered chairs, love seats and sofas. In each piece the upholstery is attached to a frame conventionally made of hardwood members. This attachment is accomplished by tacking or stapling the upholstery to the wood. These frames, generally speaking, comprise a pair of end frames connected by longitudinal rails. The end frames for a chair, love seat or sofa having the same style or design are identical, and the longitudinal rails are selected to be of a length appropriate for the piece desired. Conventionally, the end frames are built-up of separate pieces of hardwood, each of which is shaped to the proper contour and which are joined by dowelling, gluing and the like in the assembly jigs. The construction of these end frames is laborious and time consuming and accounts for most of the cost of a frame. These conventional built-up end frames are inherently weak at the joints of the members. The upholstered pieces in which they are used are heavy and are often moved about for cleaning and other purposes by tugging or pulling on one end at a time. This tends to twist the end frame and spring its joints. Prior to our invention to be described, however, no practical alternative to built-up end frames was known to the art.

Another disadvantage of conventional end frame manufacture arises from the necessity of providing right and left ends. In upholstered furniture the right and left ends are mirror images, and if one arm, for example, is curved outwardly, the other arm must be curved outwardly in the opposite direction. This means that some pieces of the frames must be cut right and left hand, and the frames assembled in right and left hand jigs. Prior to our invention to be described, no way of simplifying manufacture of right and left end frames was known.

It is an object of our invention, therefore to provide an economical and rapid process for making wood end frames for upholstered furniture to which upholstery, various supporting members and the like can be attached by tacks or staples. It is another object to provide such a process involving molding the end frames from wood flakes bonded by a resin. It is still another object to provide a process for making right and left end frames from a single pressure mold. It is yet another object to provide unitary molded end frames having higher strength and density in certain preselected regions than in others. Other objects of our invention will become apparent from the description thereof which follows.

We have found that the objects above mentioned are obtained by molding unitary end frames in molds or tools from wood flakes bonded by resin in a two-step process to be described. Our invention will best be understood as it is applied to the manufacture of an end frame illustrated in the attached figures, to which reference is now made.

FIG. 1 is a plan of an end frame for a wing chair or the like;

Figure 2:
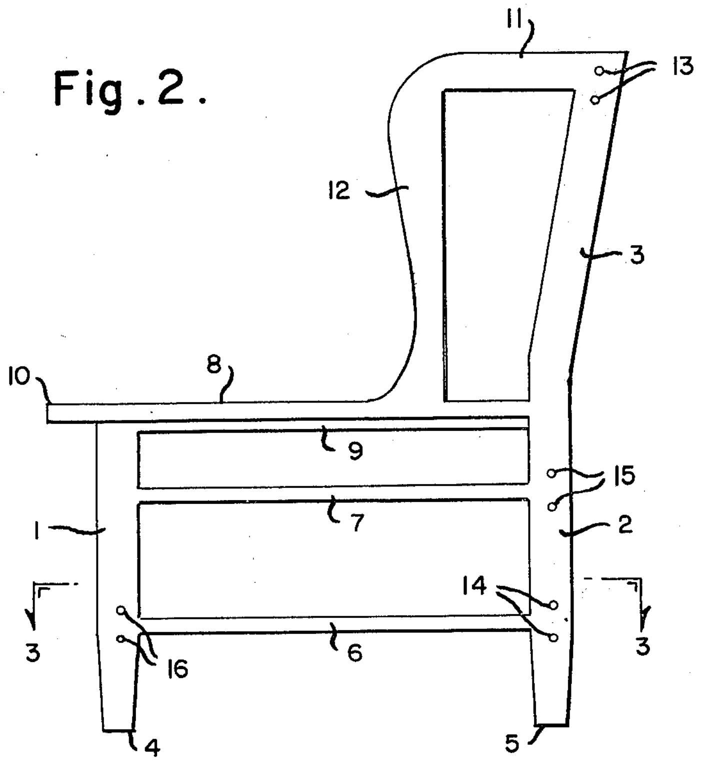
FIG. 2 is an elevation of the frame of FIG. 1.
Figure 1:
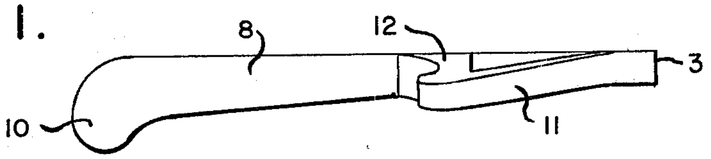

The end frame comprises an upright front leg 1 and an upright rear leg 2 which continues into an inclined back upright 3. The lower end of leg 1 is tapered to form a foot 4 and the lower end of rear leg 2 is likewise tapered to form a foot 5. A lateral rail 6 connects legs 1 and 2 above feet 4 and 5. Another lateral rail 7 connects legs 1 and 2 at the level of the chain seat. The upper end of front leg 1 terminates in arm 8 which extends laterally to the junction of rear leg 2 with back upright 3. At its junction with front leg 1, arm 8 is curved away from the plane of legs 1 and 2, as is shown in FIG. 1, into a round end 10 which overhangs leg 1 both in front and on one side. Arm 8 is also provided with an underlying rail portion 9 which extends between legs 1 and 2 and on the side of the overhang of arm 8 is flush with legs 1 and 2. Rail 9 is provided to permit tacking of the upholstery material to the frame below arm 8 and as it is attached to that arm its width need be only sufficient to accommodate tacks. The wing frame comprises horizontal element 11 which projects forward from the upper end of back upright 3 and upright element 12 which curves downwardly from element 11 and joins arm 8 intermediate legs 1 and 2. Elements 11 and 12 at their juncture are curved or flared from the plane of legs 1 and 2 in the same direction as arm 8.

Figure 3:
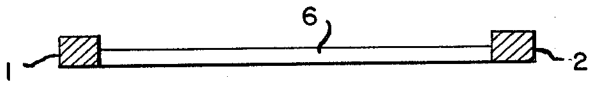
FIG. 3 is a cross section taken on the plane 3—3 of FIG. 2.

It will be seen from FIG. 3 that stretcher rail 6 is flush with legs 1 and 2 on the side beneath the overhang of arm 8. As stretcher rail 6 is merely a brace, its thickness and width will need be only that required to accommodate the upholstery tacks.

Back upright 3 at its junction point with element 11 is formed with a pair of holes 13 suitable for screws or other means for assembling the end frame with a longitudinal rail. Similar holes 14 for the same purpose are provided in rear leg 2 near foot 5, holes 15 are provided in rear leg 2 at its junction point with stretcher rail 7, and holes 16 are provided in front leg 1 near foot 4. A pair of end frames above described, one right hand and one left hand, are assembled with longitudinal rails of appropriate length to make the frame for the piece of furniture desired.

The end frame above described and illustrated in the figures has the same general overall appearance as a conventional end frame fabricated from separate members. Its various components are approximately of the same width and thickness as those of a conventional frame and its weight may be approximately the same. In order to provide increased strength, however, it is preferred to form the frame so that its density, and this its weight, is somewhat greater than that of a conventional fabricated frame.

End frames according to our invention are made by pressure molding a mixture of wood flakes and resin, to be described, in two stages. The first stage makes use of a pressure tool or mold which has a cavity shaped in plan like the end frame. This mold may conveniently be made of metal elements fastened to a metal base plate or it may be made of any other suitable material. The uncompressed mixture of wood flakes and resin is several times as deep as it is after compression and the mold must be deep enough to accommodate the volume of mixture required. The mixture is compressed by forcing a top plate or die appropriately shaped into the mold, or, alternatively forcing a top plate down onto a mold which is constructed so that its side walls telescope or retract past a bottom die or plate. Pressures on the order of 500 to 800 pounds per square inch produce preforms that are selfsustaining and can handled and moved about. No heat is applied to the mixture in the pressure mold.

The preform is then removed and placed in a curing tool which, in plan, has the contour of the end frame preform. Its depth, however, is merely sufficient to accommodate that preform. In this mold the preform is again subjected to pressures on the order of 500 pounds per square inch or more and at the same time is heated to a temperature sufficient to cause the resin to bond the wood flakes together. For the resins to be described, this temperature is in the range of 320° to 350° F. The preform is heated in the curing mold under these conditions until bonding has been fully realized and is then removed. Its density may be 20 to 25% greater than that of the wood from which the flakes are derived. This density, however, is not great enough to cause difficulty in tacking or stapling the upholstery to the frame.

Figure 4:
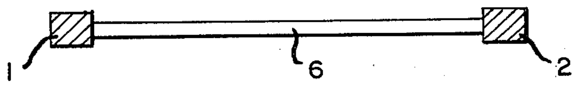
FIG. 4 is a cross section of the preform to be described, also taken on the plane 3—3 of FIG. 2.

From the foregoing, it would appear that end frames such as those illustrated in the figures would require separate pressure and separate curing molds for right and left hand ends. While the cost of the curing tools is not unduly great, the pressure molds are relatively expensive because of their more complicated construction. We have found that offset portions of the end frame, which are exemplified by stretcher rail 6 shown in FIG. 3, can be made in opposite directions by process using a single pressure mold. Stretcher rail 6, as appears in the figure above mentioned, is flush with the legs 1 and 2 on the outside of the end frame. Structurally it is not required that it be as thick as those legs and the furniture manufacturers do not want a thick rail at that location because the upholstery must be wrapped around it. We construct our pressure molds so as to position rail 6 symmetrically in plan with respect to legs 1 and 2, as is shown in FIG. 4. The separate curing molds for the right and left end frame are constructed to leave room for rail 6 positioned flush with the outside of the end frame as shown in FIG. 3. When the curing mold is closed on the symmetrical preform, therefore, rail 6, being unsupported, is moved bodily from its central position to its offset position and is cured in that latter position. Rail 7 is offset in the opposite direction in the same manner. We find that this limited displacement, which is translational only, does not appreciably impair the strength of the end frame. There is distortion of the compressed wood flakes of the preform, but not shearing.

Curved or flared surfaces, such as the wing frame comprising element 11 and 12 of the figures, can be formed by bending the preform during hot curing. We can, therefore, either mold the outer frame, both right and left in one mold with appropriate inserts or we can construct our pressure mold so that the section 50 which forms elements 11 and 12 is detachable, and provide separate sections 50' curving in opposite directions from the plane of the end frame. In this latter case it is necessary to provide separate sections of both parts of the mold.

Figure 5:
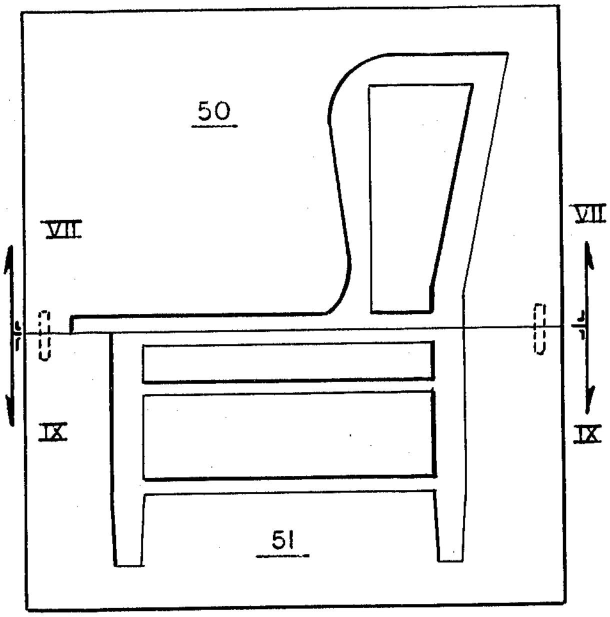
FIG. 5 is a top plan view of a two-piece pre-form mold for making the left end frame of FIG. 1.
Figure 6:
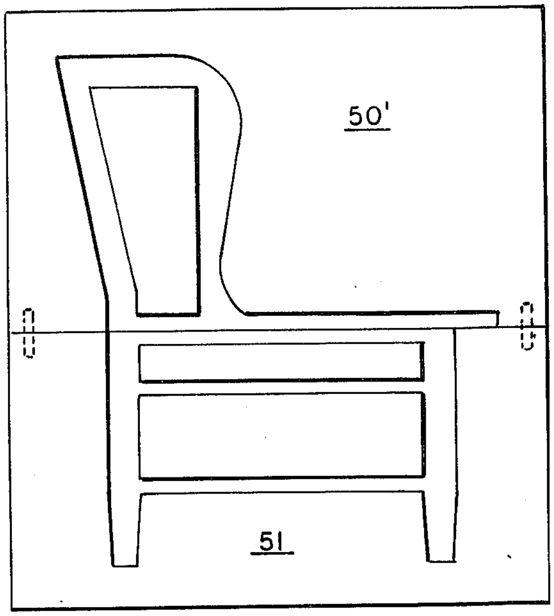
FIG. 6 is a top plan view of a two-piece pre-form mold for making the right end frame in mirror image of FIG. 1.
Figure 7:
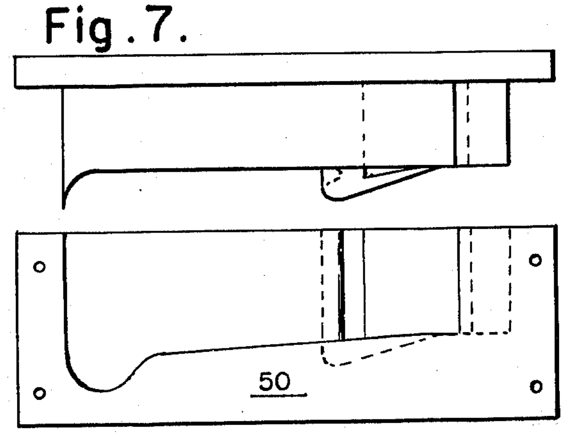
FIG. 7 is a view on the line VII—VII of FIG. 5 showing the top half of the end frame mold with the divergent portions and the plunger used therewith.
Figure 8:
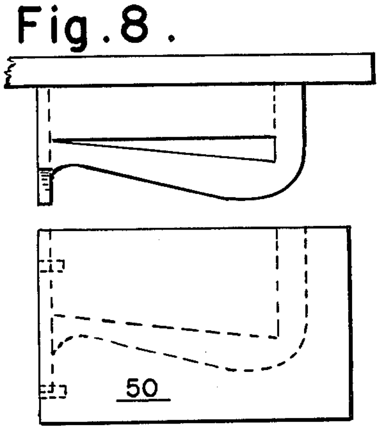
FIG. 8 is an end view of the mold portion and plunger of FIg. 7 viewed from the right of FIG. 7.
Figure 9:
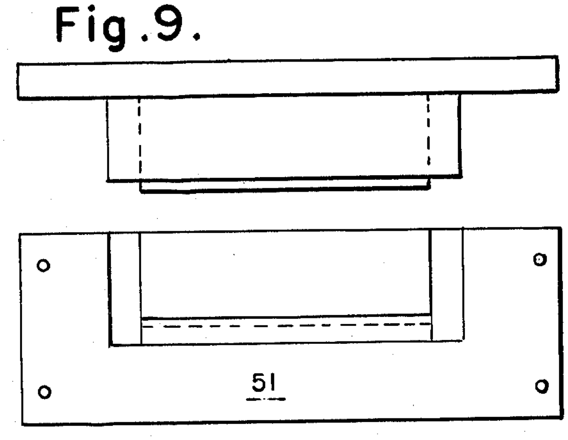
FIG. 9 is a view on the line IX—IX of FIG. 5 showing the bottom half of the end frame mold and plunger.
Figure 10:
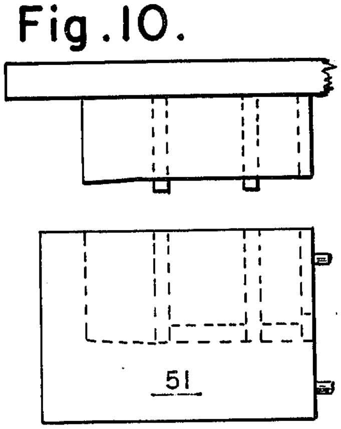
FIG. 10 is an end view of the mold portion and plunger of FIG. 9 viewed from the left of FIG. 9.
Figure 11:
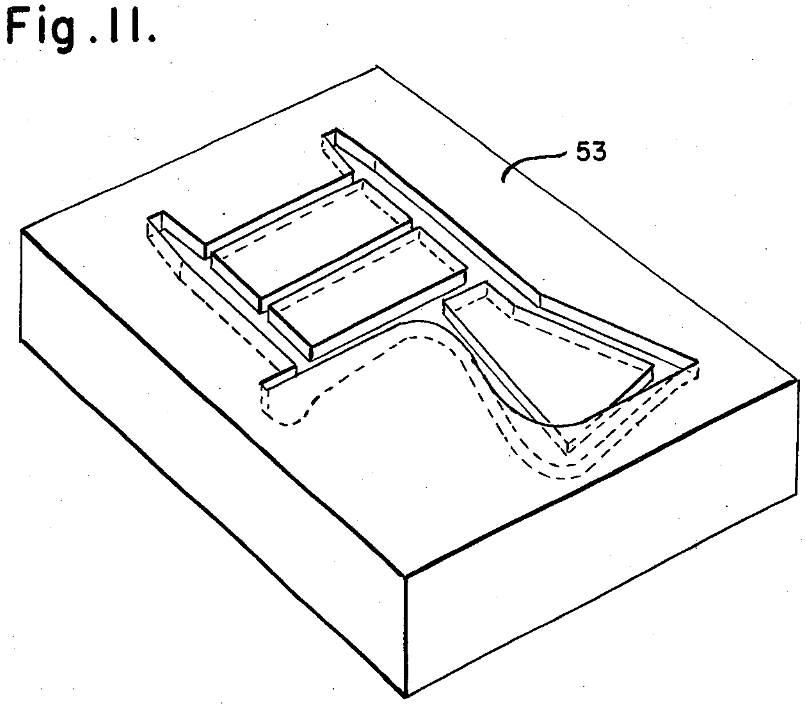
FIG. 11 is an isometric view of the heated mold for receiving the left end frame from the pre-form mold of FIG. 5.

In the first case the mold is filled and compressed to make the preform and the preform is then given the necessary bends in the hot curing press. In the second alternate form the pressure mold joined to one set of detachable sections 50–51 as shown in FIG. 5 is filled with the wood flakes-resin mixture which is compressed to make a preform. The preform is removed from the mold and the detachable mold sections 50 are detached and replaced by detachable sections 50' of opposite curvature as shown in FIG. 6. The mold with this set of detachable sections is again filled with the wood flake-resin mixture which is compressed into a preform, which is the mirror image of the preform first formed. Separate curing tools or molds 53, FIG. 11 are, of course, required for the right and left end frame preforms and in these tools the preforms are cured by heat and pressure as has previously been described.

We prefer to construct our end frames so that their density, and thus their strength, is greater at regions of greater stress than at lower regions of stress. As we have mentioned, conventional built-up frames tend to weaken or separate at the junctions of the individual members. We strengthen our end frames at such regions, for example, where the upper end of front leg 1 joins end 10 of arm 8 and in the region of hols 13 in back upright 3 where a longitudinal rail is attahced to the end frame. We accomplish this strengthening by increasing the depth of the wood flake-resin mixture loaded into the pressure tool at these regions above mentioned, and other regions of high stress, over the depth of the wood flake-resin mixture in regions of reduced stress. When the mixture is compressed and cured, the density, and therefore, the strength, of the resulting end frame is greater at the regions of greater wood flake-resin mixture depth than at other regions. Our end frames so produced, although unitary and homogeneous in composition, are strong in the regions where strength is advantageous. We do not, however, increase the density of any region of our end frame to a level which prevents or make difficult tacking or stapling.

As starting material, we prefer to use flakes of hardwood, such as maple and cherry, alone or mixed with flakes of softwood, such as pine. These flakes are made by shredding lumber scraps or logs and are from 1/16 to ¼ inch wide, about ⅛ to ⅜ inch long and about 15/1000 inch thick. When these flakes are compressed, they orient themselves in random fashion and out completed end frame shows no grain structure.

As resin, we prefer to use an amino resin or mixture of such resins, for example, a mixture of urea-formaldehyde resin and melamine-formaldehyde resin, but we find that phenol formaldehyde and polyester resin are also satisfactory. These resins are all thermosetting.

The resin is added to the wood flakes as a dry powder, or a liquid or both.

In the foregoing specification we have described a presently preferred embodiment of this invention, however, it will be understood that this invention can be otherwise embodied within the scope of the following claims.

We claim:

1. The method of pressure molding a pair of right and left hand end frames each having a planar portion and a portion diverging from the planar portion comprising (a) filling with a mixture of wood flakes and resin the cavity of a pressure mold comprehending the planar portion of each said end frame and filling with the same mixture the cavity of an attached pressure mold portion comprehending the diverging portion, said pressure molds being sufficiently deep to accommodate the uncompressed mixture of wood flakes and resin required to form said end frame pre-forms, (b) compressing the mixture to produce a self-sustaining preform having the shape of the mold and its attached portion, removing the compressed pre-form from the mold, (c) detaching the mold portion comprehending the diverging portion and substituting therefore a mold portion comprehending the portion diverging in the opposite direction, (d) filling the cavity of the mold and its attached portion with a mixture of wood flakes and resin and compressing the mixture to produce a self-sustaining pre-form which is the mirror image of the pre-form first produced, (e) transferring each pre-form to a curing mold shaped to receive and support each pre-form including its diverging portion and (f) heating and pressing each pre-form to a density greater than that of the wood from which the flakes are derived so as to bond the wood flakes together with the resin in both the planar and diverging portions of each pre-form to form fully bonded end frames.

* * * * *